United States Patent [19]

Wilson

[11] 3,726,030

[45] Apr. 10, 1973

[54] TAPE CARTRIDGE LABEL

[76] Inventor: Ronal E. Wilson, P.O. Box 5296, Bossier City, La. 71010

[22] Filed: Dec. 17, 1971

[21] Appl. No.: 209,079

[52] U.S. Cl. .......... 40/2 R, 40/86

[51] Int. Cl. .......... A44c 3/00

[58] Field of Search .......... 40/2, 312, 5, 10, 40/86

[56] References Cited

UNITED STATES PATENTS

| | | | |
|---|---|---|---|
| 1,840,143 | 1/1952 | Weindl | 40/2 |
| 2,802,290 | 8/1957 | Carey | 40/2 R |
| 3,352,027 | 11/1967 | Scwartz | 35/8 A |
| 3,559,324 | 2/1971 | Blair | 40/10 R |
| 3,350,025 | 10/1967 | Lear | 242/55.19 A |

*Primary Examiner*—Robert W. Michell
*Assistant Examiner*—Wenceslao J. Contreras
*Attorney*—William A. Strauch et al.

[57] ABSTRACT

A magnetic tape cartridge having a novel label structure which displays the complete program contained on the tape while the cartridge is in a play position within a tape player.

4 Claims, 3 Drawing Figures

INVENTOR
RONAL E. WILSON
BY Strauch, Nolan, Neale, Nies & Kurz
ATTORNEYS

TAPE CARTRIDGE LABEL

BACKGROUND OF THE INVENTION

This invention relates to a magnetic tape cartridge and a label therefor, and more particularly to a magnetic tape cartridge which includes a novel program label which displays the complete musical or other program contained on the tape while the cartridge is in playing position within the tape player.

Commercial magnetic tape cartridges are usually provided with a number of musical or other selections on the tape and each cartridge usually has a label area on either its top or bottom surface to identify the selections on the tape. However, while the cartridge is in playing position within the tape player, the top or bottom label area is not visible to the listener who, consequently, cannot determine the identity of an unknown selection without removing the cartridge from the player. Some types of cartridges, such as the one illustrated in U. S. Pat. No. 3,350,025, include a label area on its end face which is visible while the cartridge is in the play position. However, such a label area is much too small in size to permit the listing of the several selections which are generally contained on a single tape.

SUMMARY OF THE INVENTION

Accordingly, the primary object of this invention resides in the provision of a magnetic tape cartridge and a novel label tab or card fixed to the cartridge and positionable to display to the listener the complete musical program on the tape while the cartridge is in a play position within a tape player.

Another object of this invention resides in the provision of a magnetic tape cartridge having a novel label structure which is formed by an elongated tab or card having a complete musical or other program printed thereon. The tab has one end portion fixed adjacent the outer end of the cartridge and is bendable outwardly so that, when the forward or inner end of the cartridge is inserted into a tape player, the labelling or identifying printed matter on the card is visible to the listener so that a particular selection may be readily identified.

Other objects and advantages will become apparent from reading the following detailed description of the invention wherein reference is made to the accompanying drawings, in which like numerals indicate like elements.

DETAILED DESCRIPTION OF THE INVENTION

Figure 1:
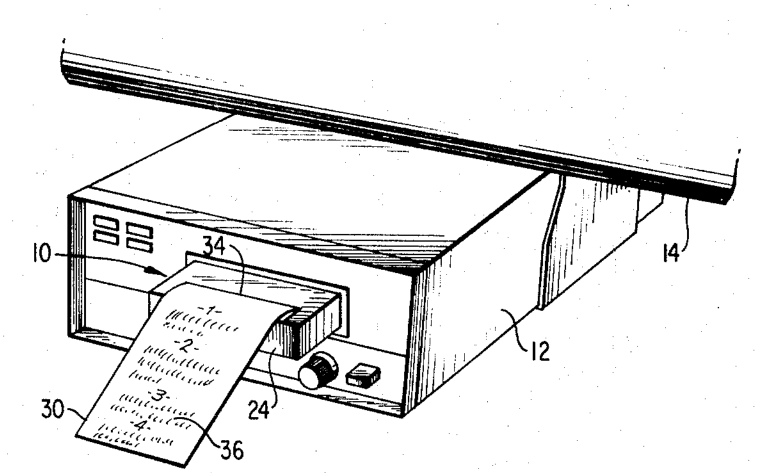
FIG. 1 is a fragmentary perspective view illustrating a magnetic tape cartridge constructed according to the invention in a play position within a tape player.

Referring to the drawings, the magnetic tape cartridge 10 may be of any conventional commercial type, such as an Audiopak cartridge of the type shown in U. S. Pat. No. 3,241,871, and playable in a conventional tape player 12, such as a Craig Pioneer Stereo 4+4 Model 3104, which is readily mountable, for example, underneath the dashboard 14 of an automobile.

Cartridge 10 conventionally includes an elongated rectangular shaped casing that has a top surface 16, bottom surface 18, sides 20, inner or forward end 22, and outer or rearward end 24. Usually a very general label 26 (FIG. 2) is adhesively fixed on the top surface 16 of the casing, while a more specific label 28, (FIG. 3) listing in detail the selections on the tape is adhesively fixed on the bottom surface 18. However, as shown in FIG. 1, when the inner casing end 22 is inserted into tape player 12 so that the selections on the tape may be played, the label areas 26 and 28 are hidden from the listener.

Figure 2:
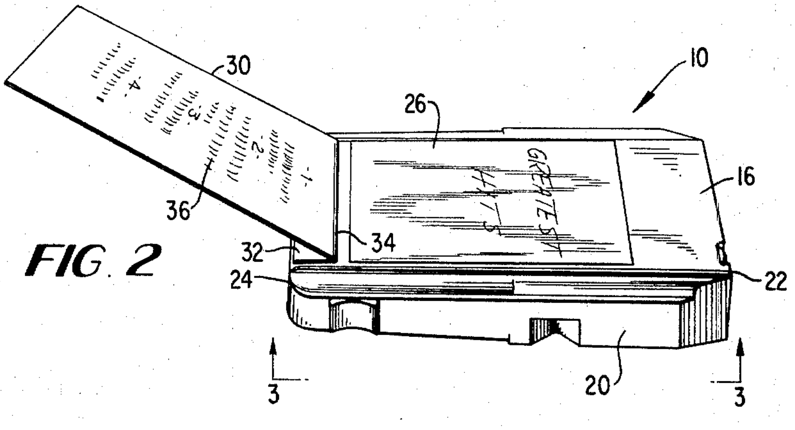
FIG. 2 is a side perspective view of the tape cartridge alone.
Figure 3:
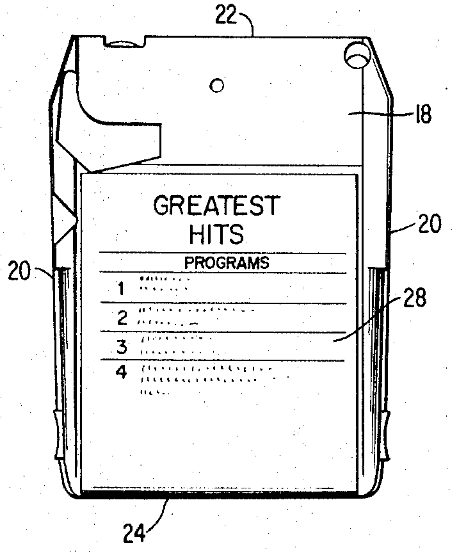
FIG. 3 is a bottom plan view of the tape cartridge taken generally along line 3—3 of FIG. 2.

In accordance with the invention, an elongated selection indicating label tag or card 30 is adhesively attached at one end portion 32 to the top surface 16 adjacent the outer end 24 of the casing. Tag 30 is bendable along the transverse fold line 34 so that when the cartridge 10 is in player 12, the tag extends outwardly away from the cartridge and player as shown in FIGS. 1 and 2 and displays the printed matter 36 which identifies all the selections in the program recorded on the tape between played. The length of card 30 preferably corresponds to the length of the cartridge 10 so that the complete program may be conveniently printed in detail on the card. When the cartridge is not in use, card 30 may be placed in superposed position with surface 16 so that the cartridge may be stored in the usual manner.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A tape cartridge device comprising a casing having inner and outer ends, the inner end of which is insertable in a player unit to place the cartridge device in a play position, label means including an elongated, program-identifying card attached to said casing adjacent said outer end, said card being movable to a position in which it identifies the program to a listener when the cartridge device is in the play position.

2. A tape cartridge device as defined in claim 1, wherein said casing is geneRally rectangular in shape and includes a surface extending between said inner and outer ends, and the length of said card corresponds essentially to the length of said surface.

3. A tape cartridge device as defined in claim 1, wherein said card has an end portion attached to said casing adjacent said outer end and the remainder of said card is bendable about a fold line adjacent said end portion so that when the cartridge device is in the play position, the card may be bent outwardly away from the cartridge and player unit and the printed, program-identifying matter on the card may be visibly displayed to a listener.

4. A tape cartridge device as defined in claim 3, wherein said casing is of generally rectangular configuration and includes a surface extending between said inner and outer ends, said end portion of said card being attached to said surface adjacent said outer end of said casing, and the length of said card corresponding essentially to the length of said surface.

* * * * *